US012594887B2

(12) United States Patent
Meyers

(10) Patent No.: US 12,594,887 B2
(45) Date of Patent: Apr. 7, 2026

(54) TECHNIQUES FOR DISPLAYING CONTENT WITH A LIVE VIDEO FEED

(71) Applicant: Apple Inc., Cupertino, CA (US)

(72) Inventor: Libo C. Meyers, San Jose, CA (US)

(73) Assignee: Apple Inc., Cupertino, CA (US)

( * ) Notice: Subject to any disclaimer, the term of this patent is extended or adjusted under 35 U.S.C. 154(b) by 13 days.

(21) Appl. No.: 18/895,940

(22) Filed: Sep. 25, 2024

(65) Prior Publication Data

US 2025/0113068 A1 Apr. 3, 2025

Related U.S. Application Data

(60) Provisional application No. 63/541,809, filed on Sep. 30, 2023.

(51) Int. Cl.
*H04N 21/414* (2011.01)
*B60R 1/22* (2022.01)
*H04N 21/218* (2011.01)

(52) U.S. Cl.
CPC ......... *B60R 1/22* (2022.01); *H04N 21/21805* (2013.01); *H04N 21/41422* (2013.01)

(58) Field of Classification Search
CPC ..................... B60R 1/20–28; H04N 21/41422
See application file for complete search history.

(56) References Cited

U.S. PATENT DOCUMENTS 9,227,568 B1 * 1/2016 Hubbell .................... B60R 1/28
11,562,550 B1 * 1/2023 Asghar .................... G06F 3/012

| | | | | |
|---|---|---|---|---|
| 2007/0150916 | A1 * | 6/2007 | Begole ............. | H04N 21/42201 |
| | | | | 382/116 |
| 2012/0218412 | A1 * | 8/2012 | Dellantoni ................ | B60R 1/27 |
| | | | | 348/148 |
| 2012/0320080 | A1 | 12/2012 | Giese et al. | |
| 2015/0049192 | A1 * | 2/2015 | Hooton ................... | B60R 11/04 |
| | | | | 348/148 |
| 2015/0279102 | A1 | 10/2015 | Fleck et al. | |
| 2016/0018887 | A1 | 1/2016 | Tsukahara et al. | |
| 2016/0132567 | A1 * | 5/2016 | Dole ........................ | G06F 16/93 |
| | | | | 707/722 |
| 2016/0210752 | A1 * | 7/2016 | Ratcliff ..................... | G06T 7/73 |
| 2016/0335739 | A1 | 11/2016 | Abraham et al. | |
| 2017/0301145 | A1 * | 10/2017 | Miller ..................... | G09G 5/14 |
| 2018/0184014 | A1 | 6/2018 | Goldstein | |
| 2020/0017026 | A1 | 1/2020 | Kumar et al. | |
| 2022/0066541 | A1 | 3/2022 | Basile, Jr. | |
| 2023/0071037 | A1 | 3/2023 | Kim et al. | |
| 2023/0138838 | A1 * | 5/2023 | Wu .................... | H04N 21/8547 |
| | | | | 725/75 |
| 2023/0219419 | A1 | 7/2023 | Kim | |

(Continued)

FOREIGN PATENT DOCUMENTS

| | | | | |
|---|---|---|---|---|
| DE | 102016206154 A1 * | 10/2017 | ............. | H04N 7/183 |
| GB | 2557996 A | 7/2018 | | |
| WO | 2023/060048 A1 | 4/2023 | | |

OTHER PUBLICATIONS

Applicant-Initiated Interview Summary received for U.S. Pat. Appl. No. 18/896,196, mailed on Aug. 15, 2025, 4 pages.

(Continued)

*Primary Examiner* — William J Kim

(74) *Attorney, Agent, or Firm* — YHE Law LLP

(57) ABSTRACT

The present disclosure generally relates to techniques for displaying content with a live video feed.

42 Claims, 10 Drawing Sheets

(56)                References Cited

U.S. PATENT DOCUMENTS

2023/0259328 A1      8/2023   Umezawa et al.
2025/0110549 A1      4/2025   Shah et al.

OTHER PUBLICATIONS

Applicant-Initiated Interview Summary received for U.S. Appl. No. 18/372,032, mailed on May 30, 2025, 2 pages.
International Search Report and Written Opinion received for PCT Patent Application No. PCT/US2024/049099, mailed on Nov. 18, 2024, 13 pages.
International Search Report and Written Opinion received for PCT Patent Application No. PCT/US2024/049102, mailed on Jan. 3, 2025, 13 pages.
Non-Final Office Action received for U.S. Appl. No. 18/372,032, mailed on May 19, 2025, 16 pages.
Non-Final Office Action received for U.S. Appl. No. 18/896,196, mailed on Jul. 30, 2025, 16 pages.
Notice of Allowance received for U.S. Appl. No. 18/372,032, mailed on Jun. 26, 2025, 9 pages.
Notice of Allowance received for U.S. Appl. No. 18/896,196, mailed on Oct. 17, 2025, 12 pages.

* cited by examiner

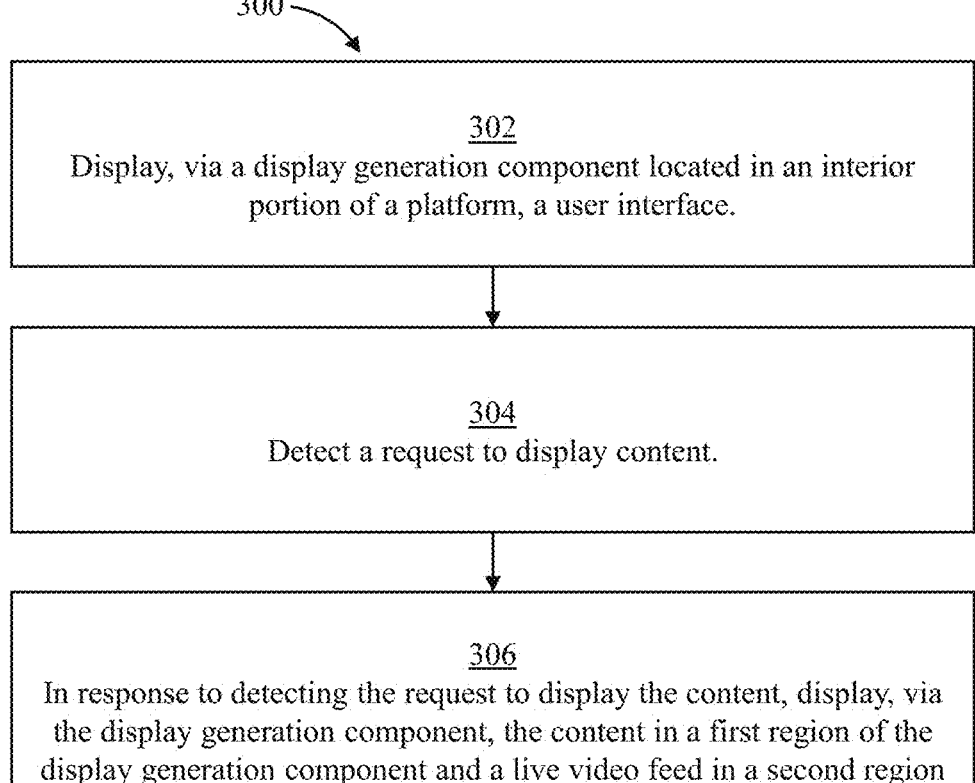

300

302
Display, via a display generation component located in an interior portion of a platform, a user interface.

304
Detect a request to display content.

306
In response to detecting the request to display the content, display, via the display generation component, the content in a first region of the display generation component and a live video feed in a second region of the display generation component, wherein the live video feed includes video of an environment exterior to the platform captured by one or more cameras of the platform.

*FIG. 3*

TECHNIQUES FOR DISPLAYING CONTENT WITH A LIVE VIDEO FEED

CROSS-REFERENCE TO RELATED APPLICATIONS

This application claims priority to U.S. Patent Application No. 63/541,809, entitled "TECHNIQUES FOR DISPLAYING CONTENT WITH A LIVE VIDEO FEED," filed Sep. 30, 2023, the entire contents of which are hereby incorporated by reference.

FIELD

The present disclosure relates generally to techniques for displaying content with a live video feed.

BACKGROUND

Platforms such as buildings and vehicles can include displays for displaying content.

SUMMARY

Some techniques for displaying content with a live video feed using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for displaying content with a live video feed. Such methods and interfaces optionally complement or replace other methods for displaying content with a live video feed. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: displaying, via a display component located in an interior portion of a platform, a user interface; detecting a request to display content; and in response to detecting the request to display the content, displaying, via the display component: the content in a first region of the display component; and a live video feed in a second region of the display component, wherein the live video feed includes video of an environment exterior to the platform captured by one or more cameras of the platform.

In accordance with some embodiments, a non-transitory computer-readable storage medium is described. The non-transitory computer-readable storage medium stores one or more programs configured to be executed by one or more processors of a computer system. The one or more programs include instructions for: displaying, via a display component located in an interior portion of a platform, a user interface; detecting a request to display content; and in response to detecting the request to display the content, displaying, via the display component: the content in a first region of the display component; and a live video feed in a second region of the display component, wherein the live video feed includes video of an environment exterior to the platform captured by one or more cameras of the platform.

In accordance with some embodiments, a transitory computer-readable storage medium is described. The transitory computer-readable storage medium stores one or more programs configured to be executed by one or more processors of a computer system. The one or more programs include instructions for: displaying, via a display component located in an interior portion of a platform, a user interface; detecting a request to display content; and in response to detecting the request to display the content, displaying, via the display component: the content in a first region of the display component; and a live video feed in a second region of the display component, wherein the live video feed includes video of an environment exterior to the platform captured by one or more cameras of the platform.

In accordance with some embodiments, a system is described. The system comprises one or more processors and memory storing one or more programs configured to be executed by the one or more processors. The one or more programs include instructions for: displaying, via a display component located in an interior portion of a platform, a user interface; detecting a request to display content; and in response to detecting the request to display the content, displaying, via the display component: the content in a first region of the display component; and a live video feed in a second region of the display component, wherein the live video feed includes video of an environment exterior to the platform captured by one or more cameras of the platform.

In accordance with some embodiments, a system is described. The system comprises: means for displaying, via a display component located in an interior portion of a platform, a user interface; means for detecting a request to display content; and means for, in response to detecting the request to display the content, displaying, via the display component: the content in a first region of the display component; and a live video feed in a second region of the display component, wherein the live video feed includes video of an environment exterior to the platform captured by one or more cameras of the platform.

In accordance with some embodiments, a computer program product is described. The computer program product comprises one or more programs configured to be executed by one or more processors of a system. The one or more programs include instructions for: displaying, via a display component located in an interior portion of a platform, a user interface; detecting a request to display content; and in response to detecting the request to display the content, displaying, via the display component: the content in a first region of the display component; and a live video feed in a second region of the display component, wherein the live video feed includes video of an environment exterior to the platform captured by one or more cameras of the platform.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for displaying content with a live video feed, thereby increasing the effectiveness, efficiency, and user satisfaction with such devices. Such methods and interfaces may complement or replace other methods for displaying content with a live video feed.

DESCRIPTION OF THE FIGURES

For a better understanding of the various described embodiments, reference should be made to the Detailed Description below, in conjunction with the following drawings in which like reference numerals refer to corresponding parts throughout the figures.

FIG. 3 is a flow diagram illustrating a method for displaying content with a live video feed, in accordance with some embodiments.

DETAILED DESCRIPTION

The following description sets forth exemplary techniques for displaying content with a live video feed. This description is not intended to limit the scope of this disclosure but is instead provided as a description of example implementations.

Users need electronic devices that provide effective techniques for displaying content with a live video feed. Efficient techniques can reduce a user's mental load when displaying content with a live video feed. This reduction in mental load can enhance user productivity and make the device easier to use. In some embodiments, the techniques described herein can reduce battery usage and processing time (e.g., by providing user interfaces that require fewer user inputs to operate).

Figure 1:
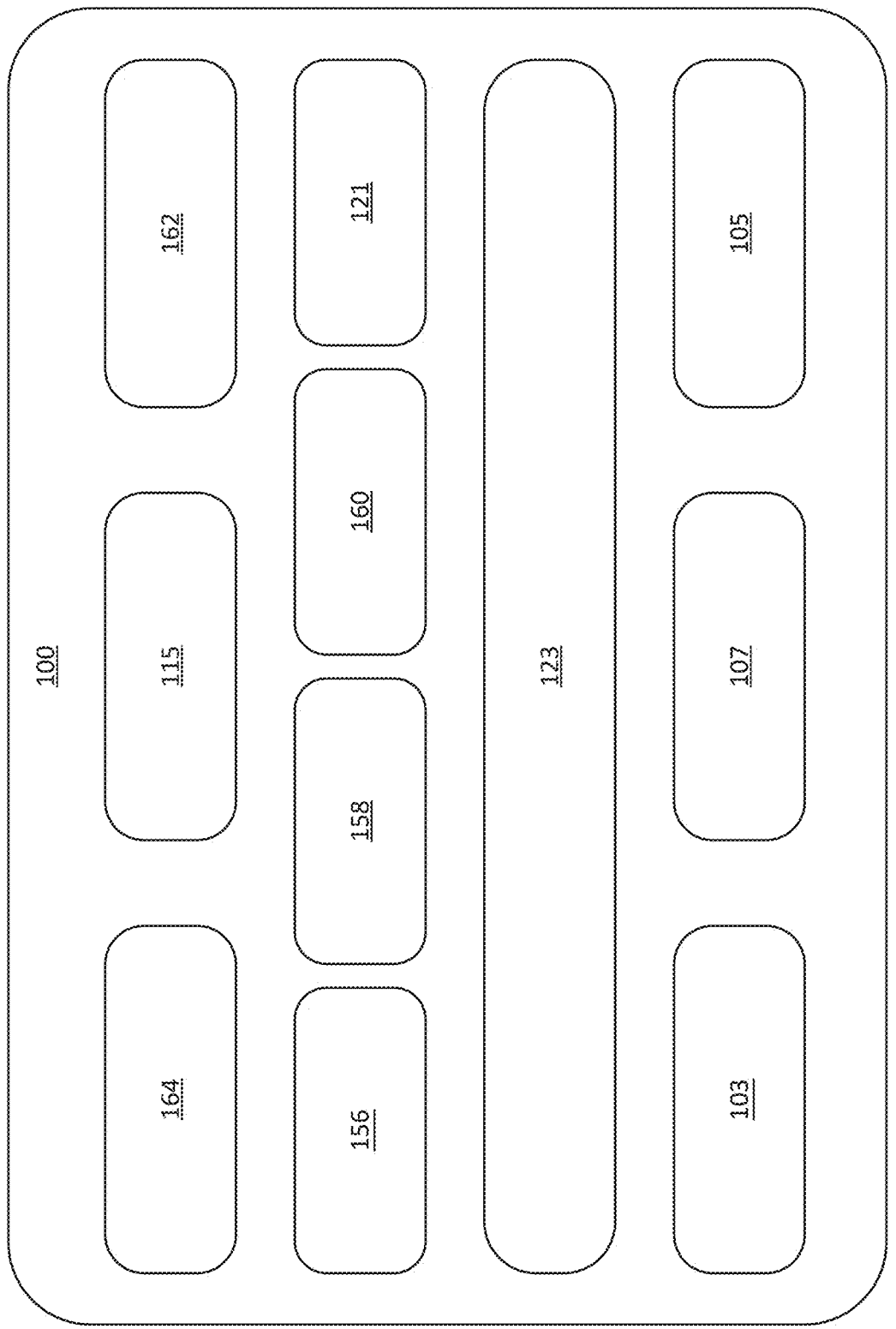
FIG. 1 is a block diagram illustrating a system with various components in accordance with some embodiments.

FIG. 1 provides illustrations of exemplary devices for performing techniques for displaying content with a live video feed. FIGS. 2A-2M illustrate exemplary user interfaces for displaying content with a live video feed in accordance with some embodiments. FIG. 3 is a flow diagram illustrating methods of displaying content with a live video feed in accordance with some embodiments. The user interfaces in FIGS. 2A-2M are used to illustrate the processes described below, including the processes in FIG. 3.

The processes below describe various techniques for making user interfaces and/or human-computer interactions more efficient (e.g., by helping the user to quickly and easily provide inputs and preventing user mistakes when operating a device). These techniques sometimes reduce the number of inputs needed for a user (e.g., a person and/or a user) to perform an operation, provide clear and/or meaningful feedback (e.g., visual, acoustic, and/or haptic feedback) to the user so that the user knows what has happened or what to expect, provide additional information and controls without cluttering the user interface, and/or perform certain operations without requiring further input from the user. Since the user can use a device more quickly and easily, these techniques sometimes improve battery life and/or reduce power usage of the device.

In methods described where one or more steps are contingent on one or more conditions having been satisfied, it should be understood that the described method can be repeated in multiple repetitions so that over the course of the repetitions all of the conditions upon which steps in the method are contingent have been satisfied in different repetitions of the method. For example, if a method requires performing a first step if a condition is satisfied, and a second step if the condition is not satisfied, it should be appreciated that the steps are repeated until the condition has been both satisfied and not satisfied, in no particular order. Thus, a method described with one or more steps that are contingent upon one or more conditions having been satisfied could be rewritten as a method that is repeated until each of the conditions described in the method has been satisfied. This multiple repetition, however, is not required of system or computer readable medium claims where the system or computer readable medium contains instructions for performing conditional operations that require that one or more conditions be satisfied before the operations occur. A person having ordinary skill in the art would also understand that, similar to a method with conditional steps, a system or computer readable storage medium can repeat the steps of a method as many times as are needed to ensure that all of the conditional steps have been performed.

The terminology used in the description of the various embodiments is for the purpose of describing particular embodiments only and is not intended to be limiting.

User interfaces for electronic devices, and associated processes for using these devices, are described below. In some embodiments, the device is a desktop computer with a touch-sensitive surface (e.g., a touch screen display and/or a touchpad). In other embodiments, the device is a portable, movable, and/or mobile electronic device (e.g., a processor, a smart phone, a smart watch, a tablet, a fitness tracking device, a laptop, a head-mounted display (HMD) device, a communal device, a vehicle, a media device, a smart speaker, a smart display, a robot, a television and/or a personal computing device).

In some embodiments, the electronic device is a computer system that is in communication with a display component (e.g., by wireless or wired communication). The display component may be integrated into the computer system or may be separate from the computer system. Additionally, the display component may be configured to provide visual output to a display (e.g., a liquid crystal display, an OLED display, or CRT display). As used herein, "displaying" content includes causing to display the content (e.g., video data rendered or decoded by a display controller) by transmitting, via a wired or wireless connection, data (e.g., image data or video data) to an integrated or external display component to visually produce the content. In some embodiments, visual output is any output that is capable of being perceived by the human eye, including, and not limited to images, videos, graphs, charts, and other graphical representations of data.

In some embodiments, the electronic device is a computer system that is in communication with an audio generation component (e.g., by wireless or wired communication). The audio generation component may be integrated into the computer system or may be separate from the computer system. Additionally, the audio generation component may be configured to provide audio output. Examples of an audio generation component include a speaker, a home theater system, a soundbar, a headphone, an earphone, an earbud, a television speaker, an augmented reality headset speaker, an audio jack, an optical audio output, a Bluetooth audio output, and/or an HDMI audio output). In some embodiments, audio output is any output that is capable of being perceived by the human ear, including, and not limited to sound waves, music, speech, and/or other audible representations of data.

In the discussion that follows, an electronic device that includes particular input and output devices is described. It should be understood, however, that the electronic device optionally includes one or more other input and/or output devices, such as physical user-interface devices (e.g., a physical keyboard, a mouse, and/or a joystick).

FIG. 1 illustrates an example system 100 for implementing techniques described herein. System 100 can perform any of the methods described in FIG. 3 (e.g., method 300) and/or portions of these methods.

In FIG. 1, system 100 includes various components, such as processor(s) 103, RF circuitry(ies) 105, memory(ies) 107, sensors 156 (e.g., image sensor(s), orientation sensor(s), location sensor(s), heart rate monitor(s), temperature sensor(s)), input component(s) 158 (e.g., camera(s) (e.g., a periscope camera, a telephoto camera, a wide-angle camera, and/or an ultra-wide-angle camera), depth sensor(s), microphone(s), touch sensitive surface(s), hardware input mechanism(s), and/or rotatable input mechanism(s)), mobility components (e.g., actuator(s) (e.g., pneumatic actuator(s), hydraulic actuator(s), and/or electric actuator(s)), motor(s), wheel(s), movable base(s), rotatable component(s), translation component(s), and/or rotatable base(s)) and output component(s) 160 (e.g., speaker(s), display component(s), audio generation component(s), haptic output device(s), display screen(s), projector(s), and/or touch-sensitive display(s)). These components optionally communicate over communication bus(es) 123 of the system. Although shown as separate components, in some implementations, various components can be combined and function as a single component, such as a sensor can be an input component.

In some embodiments, system 100 is a mobile and/or movable device (e.g., a tablet, a smart phone, a laptop, head-mounted display (HMD) device, and or a smartwatch). In other embodiments, system 100 is a desktop computer, an embedded computer, and/or a server.

In some embodiments, processor(s) 103 includes one or more general processors, one or more graphics processors, and/or one or more digital signal processors. In some embodiments, memory(ies) 107 is one or more non-transitory computer-readable storage mediums (e.g., flash memory and/or random-access memory) that store computer-readable instructions configured to be executed by processor(s) 103 to perform techniques described herein.

In some embodiments, RF circuitry(ies) 105 includes circuitry for communicating with electronic devices and/or networks (e.g., the Internet, intranets, and/or a wireless network, such as cellular networks and wireless local area networks (LANs)). In some embodiments, RF circuitry(ies) 105 includes circuitry for communicating using near-field communication and/or short-range communication, such as Bluetooth® or Ultra-wideband.

In some embodiments, display(s) 121 includes one or more monitors, projectors, and/or screens. In some embodiments, display(s) 121 includes a first display for displaying images to a first eye of a user and a second display for displaying images to a second eye of the user. In such embodiments, corresponding images can be simultaneously displayed on the first display and the second display. Optionally, the corresponding images include the same virtual objects and/or representations of the same physical objects from different viewpoints, resulting in a parallax effect that provides the user with the illusion of depth of the objects on the displays. In some embodiments, display(s) 121 is a single display. In such embodiments, corresponding images are simultaneously displayed in a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 115 for receiving user inputs, such as tap inputs and swipe inputs. In some embodiments, display(s) 121 and touch-sensitive surface(s) 115 form touch-sensitive display(s).

In some embodiments, sensor(s) 156 includes sensors for detecting various conditions. In some embodiments, sensor(s) 156 includes orientation sensors (e.g., orientation sensor(s) 111) for detecting orientation and/or movement of a platform. For example, system 100 uses orientation sensors to track changes in the location and/or orientation (sometimes collectively referred to as position) of system 100, such as with respect to physical objects in the physical environment. In some embodiments, sensor(s) 156 includes one or more gyroscopes, one or more inertial measurement units, and/or one or more accelerometers. In some embodiments, sensor(s) 156 includes a global positioning sensor (GPS) for detecting a GPS location of a platform. In some embodiments, sensor(s) 156 includes a radar system, LIDAR system, sonar system, image sensors (e.g., image sensor(s) 109, visible light image sensor(s), and/or infrared sensor(s)), depth sensor(s), rangefinder(s), and/or motion detector(s). In some embodiments, sensor(s) 156 includes sensors that are in an interior portion of system 100 and/or sensors that are on an exterior of system 100. In some embodiments, system 100 uses sensor(s) 156 (e.g., interior sensors) to detect a presence and/or state (e.g., location and/or orientation) of a passenger in the interior portion of system 100. In some embodiments, system 100 uses sensor(s) 156 (e.g., external sensors) to detect a presence and/or state of an object external to system 100. In some embodiments, system 100 uses sensor(s) 156 to receive user inputs, such as hand gestures and/or other air gesture. In some embodiments, system 100 uses sensor(s) 156 to detect the location and/or orientation of system 100 in the physical environment. In some embodiments, system 100 uses sensor(s) 156 to navigate system 100 along a planned route, around obstacles, and/or to a destination location. In some embodiments, sensor(s) 156 include one or more sensors for identifying and/or authenticating a user of system 100, such as a fingerprint sensor and/or facial recognition sensor.

In some embodiments, image sensor(s) includes one or more visible light image sensor, such as charged coupled device (CCD) sensors, and/or complementary metal-oxide-semiconductor (CMOS) sensors operable to obtain images of physical objects. In some embodiments, image sensor(s) includes one or more infrared (IR) sensor(s), such as a passive IR sensor or an active IR sensor, for detecting infrared light. For example, an active IR sensor can include an IR emitter, such as an IR dot emitter, for emitting infrared light. In some embodiments, image sensor(s) includes one or more camera(s) configured to capture movement of physical objects. In some embodiments, image sensor(s) includes one or more depth sensor(s) configured to detect the distance of physical objects from system 100. In some embodiments, system 100 uses CCD sensors, cameras, and depth sensors in combination to detect the physical environment around system 100. In some embodiments, image sensor(s) includes a first image sensor and a second image sensor different form the first image sensor. In some embodiments, system 100 uses image sensor(s) to receive user inputs, such as hand gestures and/or other air gestures. In some embodiments, system 100 uses image sensor(s) to detect the location and/or orientation of system 100 in the physical environment.

In some embodiments, system 100 uses orientation sensor(s) for detecting orientation and/or movement of system 100. For example, system 100 can use orientation sensor(s) to track changes in the location and/or orientation of system 100, such as with respect to physical objects in the physical environment. In some embodiments, orientation sensor(s) includes one or more gyroscopes, one or more inertial measurement units, and/or one or more accelerometers.

In some embodiments, system 100 uses microphone(s) to detect sound from one or more users and/or the physical environment of the one or more users. In some embodiments, microphone(s) includes an array of microphones (including a plurality of microphones) that optionally operate in tandem, such as to identify ambient noise or to locate the source of sound in space (e.g., inside system 100 and/or outside of system 100) of the physical environment.

In some embodiments, input component(s) 158 includes one or more mechanical and/or electrical devices for detecting input, such as button(s), slider(s), knob(s), switch(es), remote control(s), joystick(s), touch-sensitive surface(s), keypad(s), microphone(s), and/or camera(s). In some embodiments, input component(s) 158 include one or more input devices inside system 100. In some embodiments, input component(s) 158 include one or more input devices (e.g., a touch-sensitive surface and/or keypad) on an exterior of system 100.

In some embodiments, output device(s) 160 include one or more devices, such as display(s), monitor(s), projector(s), speaker(s), light(s), and/or haptic output device(s). In some embodiments, output device(s) 160 includes one or more external output devices, such as external display screen(s), external light(s), and/or external speaker(s). In some embodiments, output device(s) 160 includes one or more internal output devices, such as internal display screen(s), internal light(s), and/or internal speaker(s).

In some embodiments, environment controls 162 includes mechanical and/or electrical systems for monitoring and/or controlling conditions of an internal portion (e.g., cabin) of system 100. In some embodiments, environmental controls 162 includes fan(s), heater(s), air conditioner(s), and/or thermostat(s) for controlling the temperature and/or airflow within the interior portion of system 100.

In some embodiments, mobility component(s) includes mechanical and/or electrical components that enable a platform to move and/or assist in the movement of the platform. In some embodiments, mobility system 164 includes powertrain(s), drivetrain(s), motor(s) (e.g., an electrical motor), engine(s), power source(s) (e.g., battery(ies)), transmission(s), suspension system(s), speed control system(s), and/or steering system(s). In some embodiments, one or more elements of mobility component(s) are configured to be controlled autonomously or manually (e.g., via system 100 and/or input component(s) 158).

In some embodiments, system 100 performs monetary transactions with or without another computer system. For example, system 100, or another computer system associated with and/or in communication with system 100 (e.g., via a user account described below), is associated with a payment account of a user, such as a credit card account or a checking account. To complete a transaction, system 100 can transmit a key to an entity from which goods and/or services are being purchased that enables the entity to charge the payment account for the transaction. As another example, system 100 stores encrypted payment account information and transmits this information to entities from which goods and/or services are being purchased to complete transactions.

System 100 optionally conducts other transactions with other systems, computers, and/or devices. For example, system 100 conducts transactions to unlock another system, computer, and/or device and/or to be unlocked by another system, computer, and/or device. Unlocking transactions optionally include sending and/or receiving one or more secure cryptographic keys using, for example, RF circuitry(ies) 105.

In some embodiments, system 100 is capable of communicating with other computer systems and/or electronic devices. For example, system 100 can use RF circuitry(ies) 105 to access a network connection that enables transmission of data between systems for the purpose of communication. Example communication sessions include phone calls, e-mails, SMS messages, and/or videoconferencing communication sessions.

In some embodiments, videoconferencing communication sessions include transmission and/or receipt of video and/or audio data between systems participating in the videoconferencing communication sessions, including system 100. In some embodiments, system 100 captures video and/or audio content using sensor(s) 156 to be transmitted to the other system(s) in the videoconferencing communication sessions using RF circuitry(ies) 105. In some embodiments, system 100 receives, using the RF circuitry(ies) 105, video and/or audio from the other system(s) in the videoconferencing communication sessions, and presents the video and/or audio using output component(s) 160, such as display(s) 121 and/or speaker(s). In some embodiments, the transmission of audio and/or video between systems is near real-time, such as being presented to the other system(s) with a delay of less than 0.1, 0.5, 1, or 3 seconds from the time of capturing a respective portion of the audio and/or video.

In some embodiments, the system 100 generates tactile (e.g., haptic) outputs using output component(s) 160. In some embodiments, output component(s) 160 generates the tactile outputs by displacing a moveable mass relative to a neutral position. In some embodiments, tactile outputs are periodic in nature, optionally including frequency(ies) and/or amplitude(s) of movement in two or three dimensions. In some embodiments, system 100 generates a variety of different tactile outputs differing in frequency(ies), amplitude(s), and/or duration/number of cycle(s) of movement included. In some embodiments, tactile output pattern(s) includes a start buffer and/or an end buffer during which the movable mass gradually speeds up and/or slows down at the start and/or at the end of the tactile output, respectively.

In some embodiments, tactile outputs have a corresponding characteristic frequency that affects a "pitch" of a haptic sensation that a user feels. For example, higher frequency(ies) corresponds to faster movement(s) by the moveable mass whereas lower frequency(ies) corresponds to slower movement(s) by the moveable mass. In some embodiments, tactile outputs have a corresponding characteristic amplitude that affects a "strength" of the haptic sensation that the user feels. For example, higher amplitude(s) corresponds to movement over a greater distance by the moveable mass, whereas lower amplitude(s) corresponds to movement over a smaller distance by the moveable mass. In some embodiments, the "pitch" and/or "strength" of a tactile output varies over time.

In some embodiments, tactile outputs are distinct from movement of system 100. For example, system 100 can includes tactile output device(s) that move a moveable mass to generate tactile output and can include other moving part(s), such as motor(s), wheel(s), axel(s), control arm(s), and/or brakes that control movement of system 100. Although movement and/or cessation of movement of system 100 generates vibrations and/or other physical sensations in some situations, these vibrations and/or other physical sensations are distinct from tactile outputs. In some embodiments, system 100 generates tactile output independent from movement of system 100 For example, system 100 can generate a tactile output without accelerating, decelerating, and/or moving system 100 to a new position.

In some embodiments, system 100 detects gesture input(s) made by a user. In some embodiments, gesture input(s) includes touch gesture(s) and/or air gesture(s), as described herein. In some embodiments, touch-sensitive surface(s) 115 identify touch gestures based on contact patterns (e.g., different intensities, timings, and/or motions of objects touching or nearly touching touch-sensitive surface(s) 115). Thus, touch-sensitive surface(s) 115 detect a gesture by detecting a respective contact pattern. For example, detecting a finger-down event followed by detecting a finger-up (e.g., liftoff) event at (e.g., substantially) the same position as the finger-down event (e.g., at the position of a user interface element) can correspond to detecting a tap gesture on the user interface element. As another example, detecting a finger-down event followed by detecting movement of a contact, and subsequently followed by detecting a finger-up (e.g., liftoff) event can correspond to detecting a swipe gesture. Additional and/or alternative touch gestures are possible.

In some embodiments, an air gesture is a gesture that a user performs without touching input component(s) 158. In some embodiments, air gestures are based on detected motion of a portion (e.g., a hand, a finger, and/or a body) of a user through the air. In some embodiments, air gestures include motion of the portion of the user relative to a reference. Example references include a distance of a hand of a user relative to a physical object, such as the ground, an angle of an arm of the user relative to the physical object, and/or movement of a first portion (e.g., hand or finger) of the user relative to a second portion (e.g., shoulder, another hand, or another finger) of the user. In some embodiments, detecting an air gesture includes detecting absolute motion of the portion of the user, such as a tap gesture that includes movement of a hand in a predetermined pose by a predetermined amount and/or speed, or a shake gesture that includes a predetermined speed or amount of rotation of a portion of the user.

In some embodiments, detecting one or more inputs includes detecting speech of a user. In some embodiments, system 100 uses one or more microphones of input component(s) 158 to detect the user speaking one or more words. In some embodiments, system 100 parses and/or communicates information to one or more other systems to determine contents of the speech of the user, including identifying words and/or obtaining a semantic understanding of the words. For example, system processor(s) 103 can be configured to perform natural language processing to detect one or more words and/or determine a likely meaning of the one or more words in the sequence spoken by the user. Additionally or alternatively, in some embodiments, the system 100 determines the meaning of the one or more words in the sequence spoken based upon a context of the user determined by the system 100.

In some embodiments, system 100 outputs spatial audio via output component(s) 160. In some embodiments, spatial audio is output in a particular position. For example, system 100 can play a notification chime having one or more characteristics that cause the notification chime to be generated as if emanating from a first position relative to a current viewpoint of a user (e.g., "spatializing" and/or "spatialization" including audio being modified in amplitude, filtered, and/or delayed to provide a perceived spatial quality to the user).

In some embodiments, system 100 presents visual and/or audio feedback indicating a position of a user relative to a current viewpoint of another user, thereby informing the other user about an updated position of the user. In some embodiments, playing audio corresponding to a user includes changing one or more characteristics of audio obtained from another computer system to mimic an effect of placing an audio source that generates the play back of audio within a position corresponding to the user, such as a position within a three-dimensional environment that the user moves to, spawns at, and/or is assigned to. In some embodiments, a relative magnitude of audio at one or more frequencies and/or groups of frequencies is changed, one or more filters are applied to audio (e.g., directional audio filters), and/or the magnitude of audio provided via one or more channels are changed (e.g., increased or decreased) to create the perceived effect of the physical audio source. In some embodiments, the simulated position of the simulated audio source relative to a floor of the three-dimensional environment matches an elevation of a head of a participant providing audio that is generated by the simulated audio source, or is a predetermined one or more elevations relative to the floor of the three-dimensional environment. In some embodiments, in accordance with a determination that the position of the user will correspond to a second position, different from the first position, and that one or more first criteria are satisfied, system 100 presents feedback including generating audio as if emanating from the second position.

In some embodiments, system 100 communicates with one or more accessory devices. In some embodiments, one or more accessory devices is integrated with system 100. In some embodiments, one or more accessory devices is external to system 100. In some embodiments, system 100 communicates with accessory device(s) using RF circuitry(ies) 105 and/or using a wired connection. In some embodiments, system 100 controls operation of accessory device(s), such as door(s), window(s), lock(s), speaker(s), light(s), and/or camera(s). For example, system 100 can control operation of a motorized door of system 100. As another example, system 100 can control operation of a motorized window included in system 100. In some embodiments, accessory device(s), such as remote control(s) and/or other computer systems (e.g., smartphones, media players, tablets, computers, and/or wearable devices) functioning as input devices control operations of system 100. For example, a wearable device (e.g., a smart watch) functions as a key to initiate operation of an actuation system of system 100. In some embodiments, system 100 acts as an input device to control operations of another system, device, and/or computer, such as the platform 100 functioning as a key to initiate operation of an actuation system of a platform associated with another system, device, and/or computer.

In some embodiments, digital assistant(s) help a user perform various functions using system 100. For example, a digital assistant can provide weather updates, set alarms, and perform searches locally and/or using a network connection (e.g., the Internet) via a natural-language interface. In some embodiments, a digital assistant accepts requests at least partially in the form of natural language commands, narratives, requests, statements, and/or inquiries. In some embodiments, a user requests an informational answer and/or performance of a task using the digital assistant. For example, in response to receiving the question "What is the current temperature?," the digital assistant answers "It is 30 degrees." As another example, in response to receiving a request to perform a task, such as "Please invite my family to dinner tomorrow," the digital assistant can acknowledge the request by playing spoken words, such as "Yes, right away," and then send the requested calendar invitation on behalf of the user to each family member of the user listed in a contacts list for the user. In some embodiments, during performance of a task requested by the user, the digital assistant engages with the user in a sustained conversation involving multiple exchanges of information over a period of time. Other ways of interacting with a digital assistant are possible to request performance of a task and/or request information. For example, the digital assistant can respond to the user in other forms, e.g., displayed alerts, text, videos, animations, music, etc. In some embodiments, the digital assistant includes a client-side portion executed on system 100 and a server-side portion executed on a server in communication with system 100. The client-side portion can communicate with the server through a network connection using RF circuitry(ies) 105. The client-side portion can provide client-side functionalities, input and/or output processing and/or communication with the server, for example. In some embodiments, the server-side portion provides server-side functionalities for any number client-side portions of multiple systems.

In some embodiments, system 100 is associated with one or more user accounts. In some embodiments, system 100 saves and/or encrypts user data, including files, settings, and/or preferences in association with particular user accounts. In some embodiments, user accounts are password-protected and system 100 requires user authentication before accessing user data associated with an account. In some embodiments, user accounts are associated with other system(s), device(s), and/or server(s). In some embodiments, associating one user account with multiple systems enables those systems to access, update, and/or synchronize user data associated with the user account. For example, the systems associated with a user account can have access to purchased media content, a contacts list, communication sessions, payment information, saved passwords, and other user data. Thus, in some embodiments, user accounts provide a secure mechanism for a customized user experience.

FIGS. 2A-2M illustrate example techniques for displaying content with a live video feed, in accordance with some embodiments. FIG. 3 is a flow diagram of an exemplary method 300 for displaying content with a live video feed, in accordance with some embodiments. The example embodiments shown in FIGS. 2A-2M are used to illustrate the processes described below, including the processes in FIG. 3.

Figure 2A:
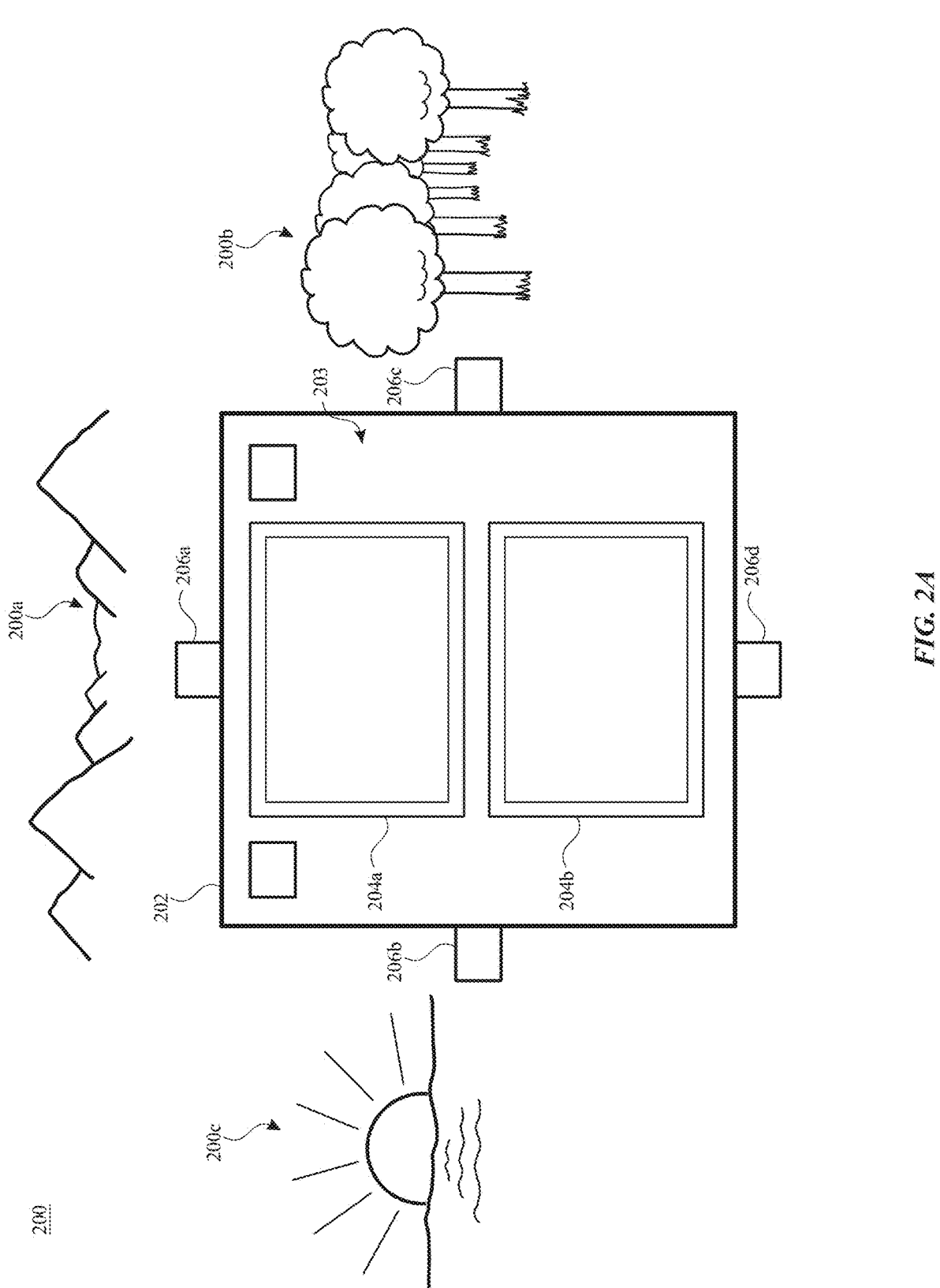
FIGS. 2A-2M illustrate example techniques for displaying content with a live video feed, in accordance with some embodiments.

FIG. 2A shows platform 202 in environment 200. Environment 200 includes mountains 200a in front of platform 202, trees 200b on a right side of platform 202, and sunset 200c on a left side of platform 202. Platform 202 includes first display 204a and second display 204b in interior portion 203 of platform 202. In some embodiments, any of the features described with reference to display 204a can be applied to and/or performed by display 204b. In some embodiments, display 204a and/or display 204b are controlled by a computer system included in and/or in communication with platform 202. External sensors 206a-206d (e.g., cameras) are located on an exterior of platform 202, and internal sensors 206e-206f (e.g., cameras) are in interior portion 203 of platform 202. Exterior sensors 206a-206d are configured to capture images and or video of environment 200 exterior to platform 202.

Figure 2B:
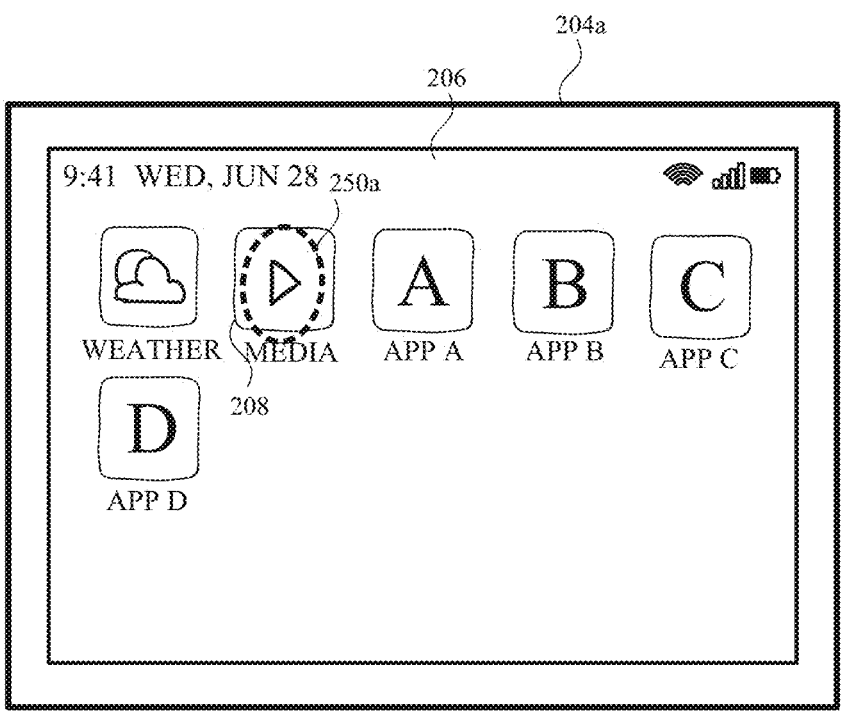
Figure 2C:
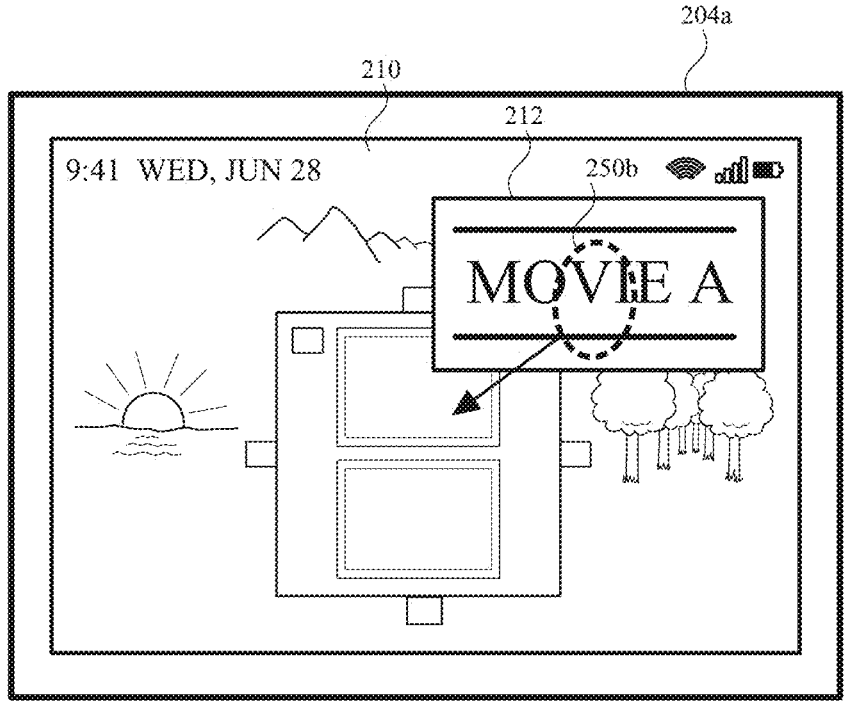

FIG. 2B shows an isolated view of display 204a. In FIG. 2B, display 204a displays user interface 206 (e.g., a home screen and/or application springboard). In FIG. 2B, input 250a selecting media application icon 208 is detected. In some embodiments, input 250a includes a tap on display 204a, a press of a button while media application icon 208 is designated, and/or other input corresponding to a selection of media application icon 208. In response to input 250a, display 204a displays content 212 and live video feed 210, as shown in FIG. 2C. In the embodiment illustrated in FIG. 2C, content 212 includes a user interface (e.g., a window) of a media application corresponding to media application icon 208 and live video feed 210 is displayed in the background behind content 212. Live video feed 210 shown in FIG. 2C provides a first view of environment 200 exterior to platform 202 captured by one or more of external sensors 206a-206d. In some embodiments, live video feed 210 includes a wide-angle field of view, a 360-degree field of view, and/or a fisheye field of view of environment 200 external to platform 202. In some embodiments, live video feed 210 includes images and/or video captured by two or more of external sensors 206a-206d.

In FIG. 2C, input 250b corresponding to a request to move and enlarge content 212 on display 204a is detected. In some embodiments, input 250b includes a drag, de-pinch, and/or other input corresponding to a request to move and/or enlarge content 212. In response to input 250b, content 212 is moved and enlarged on display 204a, while maintaining display of live video feed 210, as shown in FIG. 2D.

Figure 2D:
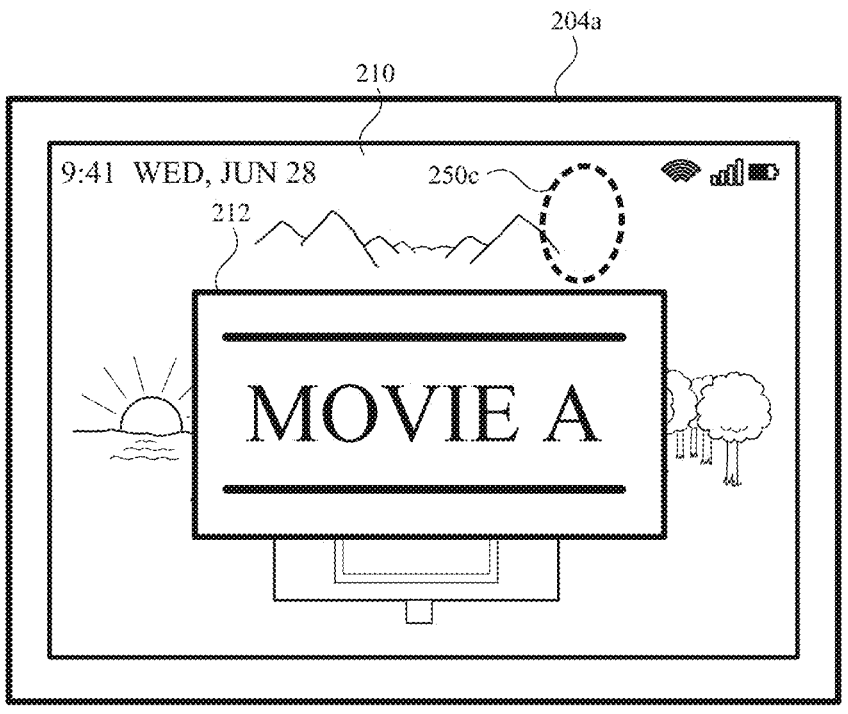
Figure 2E:
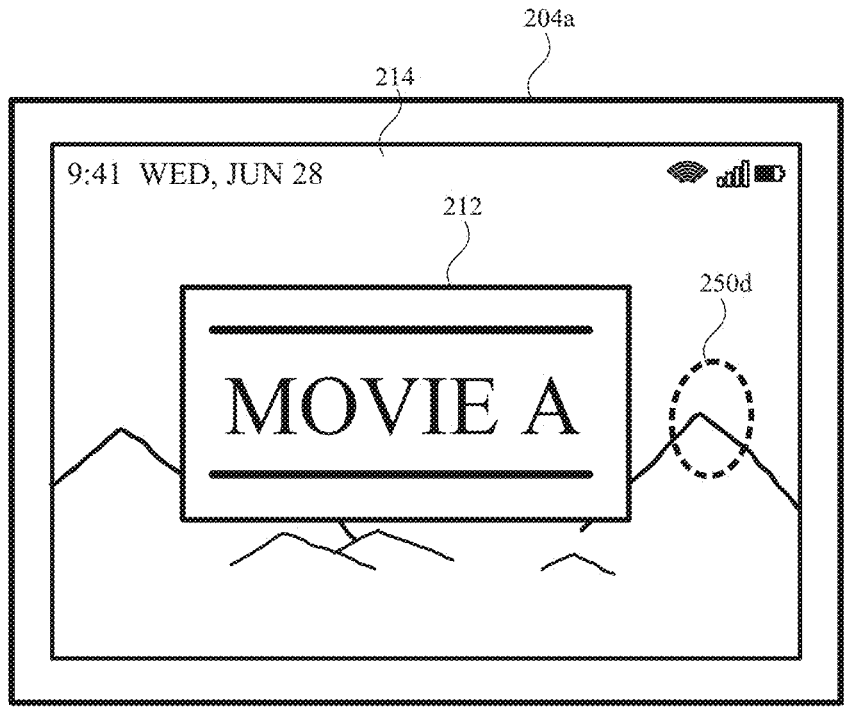

In FIG. 2D, input 250c corresponding to a request to change the view (e.g., the live video feed) of external environment 200 displayed on display 204a is detected. In the embodiment illustrated in FIG. 2D, input 250c includes a tap and/or other input selecting live video feed 210. In response to detecting input 250c, display 204a displays live video feed 214 of environment 200 external to platform 202, as shown in FIG. 2E. Live video feed 214 includes a different (e.g., narrower) view of environment 200 than live video feed 210. In the embodiment illustrated in FIG. 2E, live video feed 214 includes a view of environment 200 in front of platform 202 (e.g., of mountains 200a). In this way, a user can change, select, and/or customize the view of environment 200 displayed in the background of content 212.

Figure 2F:
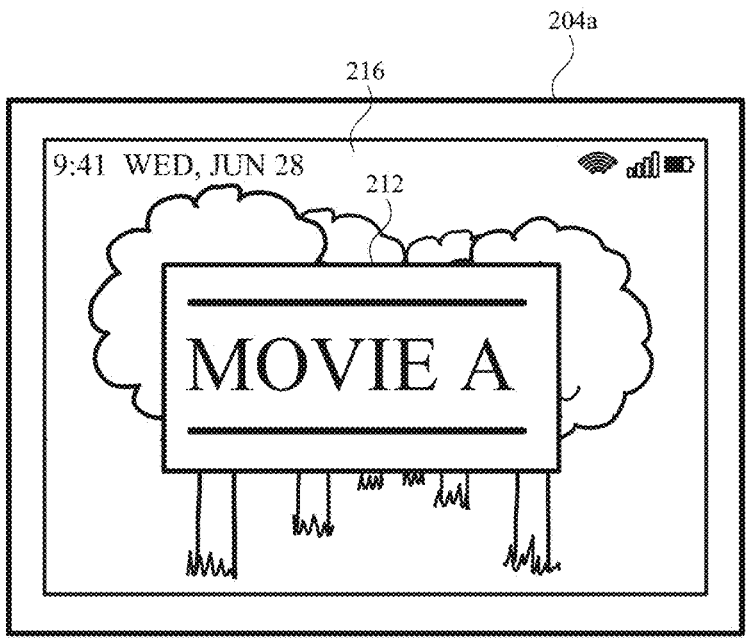

In FIG. 2E, input 250d corresponding to a request (e.g., another request) to change the view (e.g., the live video feed) of external environment 200 displayed on display 204a is detected. In the embodiment illustrated in FIG. 2E, input 250c includes a tap and/or other input directed to a right side of live video feed 214. In response to detecting input 250d, display 204a displays live video feed 216 of environment 200 external to platform 202, as shown in FIG. 2F. Live video feed 216 includes a view in a different direction of environment 200 than live video feed 214 (e.g., but with the same size field of view). In the embodiment illustrated in FIG. 2F, live video feed 214 includes a view of environment 200 to the right of platform 202 (e.g., of trees 200b). In some embodiments, the view of environment 200 displayed in response to input 250d is based on a location of input 250d. For example, because input 250d is directed to a right side of display 204a and/or live video feed 214, display 204a changes the view to a view to the right of platform 202. In some embodiments, in response to an input directed to a left side of display 204a and/or live video feed 214, display 204a displays a view to the left of platform 202 (e.g., a view of sunset 200c). In this way, a user can change, select, and/or customize the direction of the view of environment 200 displayed in the background of content 212.

Figure 2G:
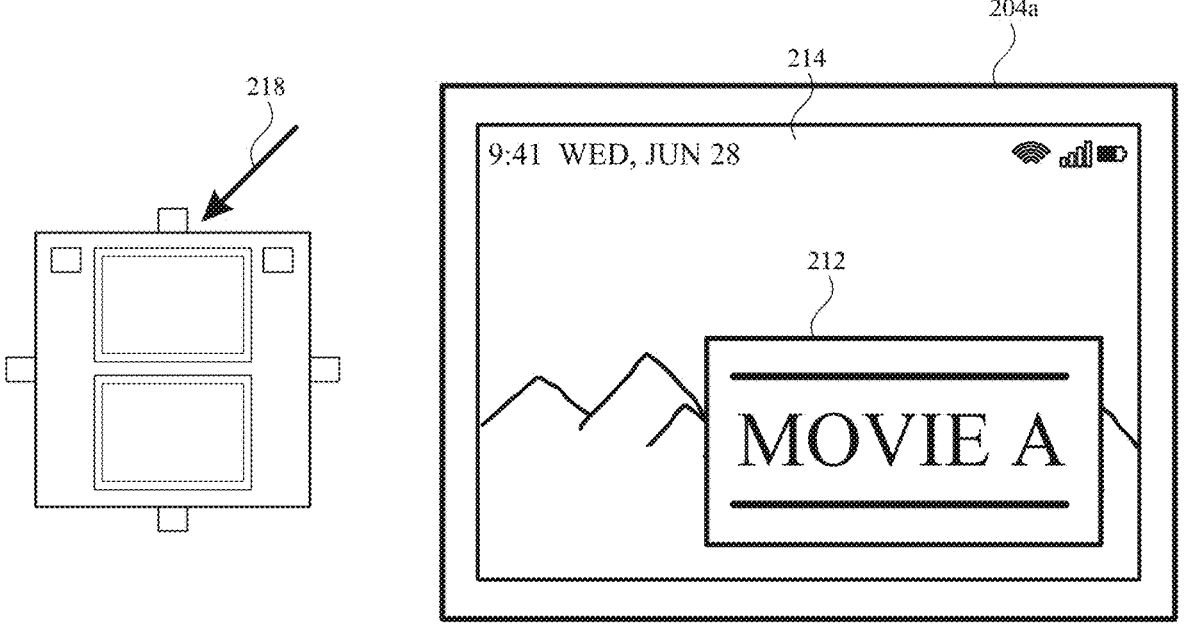

Turning to FIG. 2G, platform 202 moves with movement (e.g., direction speed, velocity, acceleration, rotation, and/or vibration) represented by movement indicator 218. In some embodiments, content 212 moves on display 204*a* in response to movement of platform 202. Moving content 212 in response to movement of platform 202 can help provide comfort to a user viewing content 212 while platform 202 is moving by providing a visual effect that corresponds to motion that the user is experiencing and/or feeling. For example, in FIG. 2G, in response to detecting the movement represented by movement indicator 218, display 204*a* moves (e.g., translates and/or shifts) content 212 on display 204*a*.

In the embodiment illustrated in FIG. 2G, display 204*a* moves content 212 in a direction that is opposite of a direction of the movement of platform 202 (e.g., similar to the way in which a user would lean or feel as though he or she is being pushed in the opposite direction that platform 202 is moving). In some embodiments, display 204*a* moves content 212 in the same direction as the movement of platform 202. In some embodiments, in response to detecting motion of platform 202, display 204*a* changes a size, shape, color, orientation, and/or opacity of content 212 with or without changing the position of content 212.

Figure 2H:
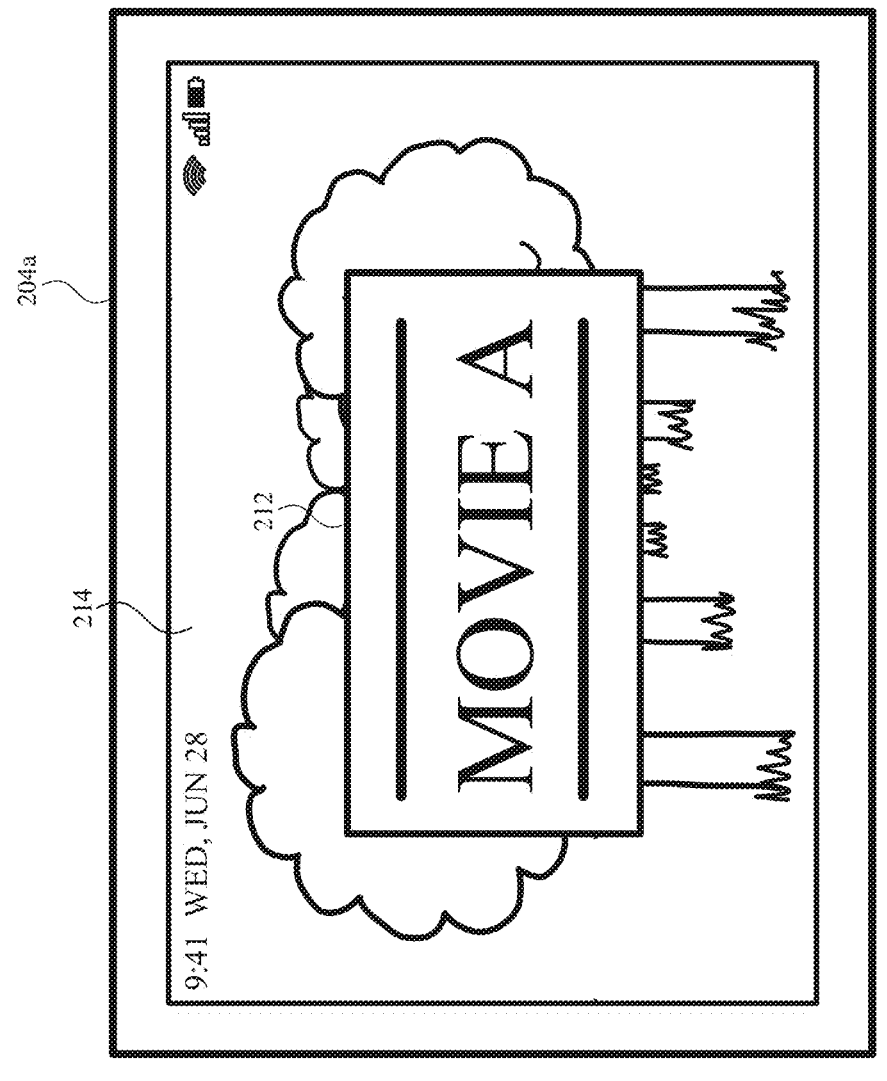
Figure 2H:
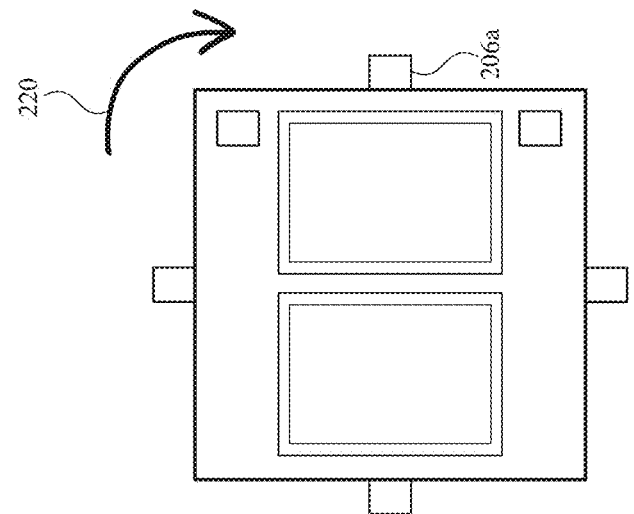

Turning to FIG. 2H, platform 202 is oriented (e.g., has turned) 90 degrees to the right compared to the orientation of platform 202 shown in FIG. 2A such that the front of platform 202 (e.g., represented by the side of platform 202 on which exterior sensor 206*a* is located) is facing trees 200*b*. Display 204*a* displays live video feed 214, which provides a view of environment 200 in front of platform 202 described above with reference to FIG. 2E. Because platform 202 is facing trees 200*b*, live video feed 214 includes a view of trees 200*b* (e.g., instead of mountains 200*a* as shown in FIG. 2E).

Figure 2I:
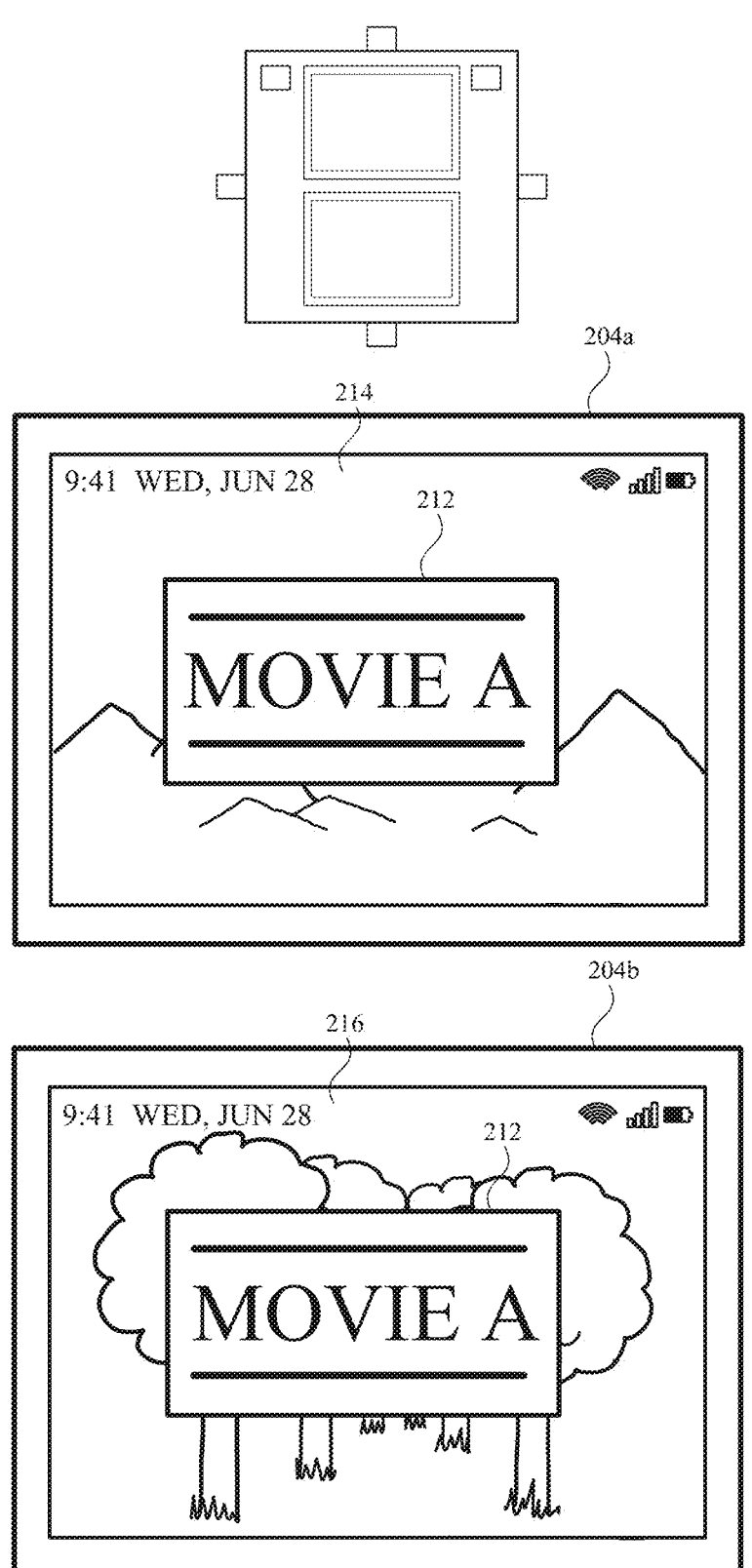

Turning to FIG. 2I, expanded views of display 204*a* and display 204*b* are shown. In some embodiments, different displays within platform 202 display different views of environment 200 external to platform 202. In some embodiments, the view of environment 200 displayed on a display is based on a location of the display within platform 202. For example, in FIG. 2I, display 204*a* displays a view of environment 200 in front of platform 202 because display 204*a* is closer to the front of platform 202 than display 204*b*, and display 204*b* displays a view (e.g., live video feed 216) of environment 200 to a side (e.g., the right or left side) of platform 202 because display 204*b* is closer to the back of platform 202 than display 204*a* (e.g., because a user viewing display 204*b* may be blocked from seeing a view out the front of platform 202 by display 204*a* and/or other users in front of display 204*b*).

Figure 2J:
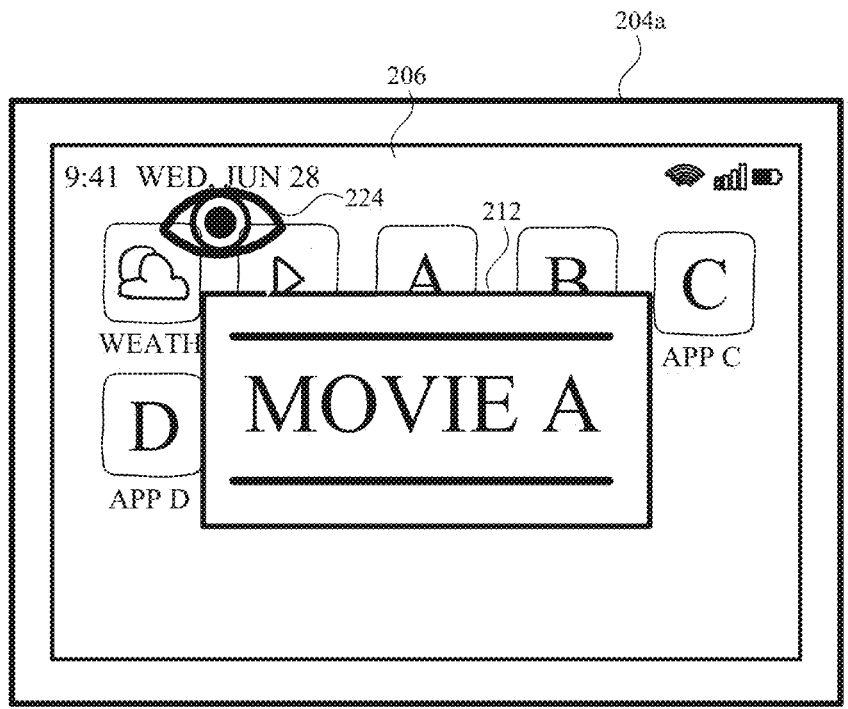
Figure 2K:
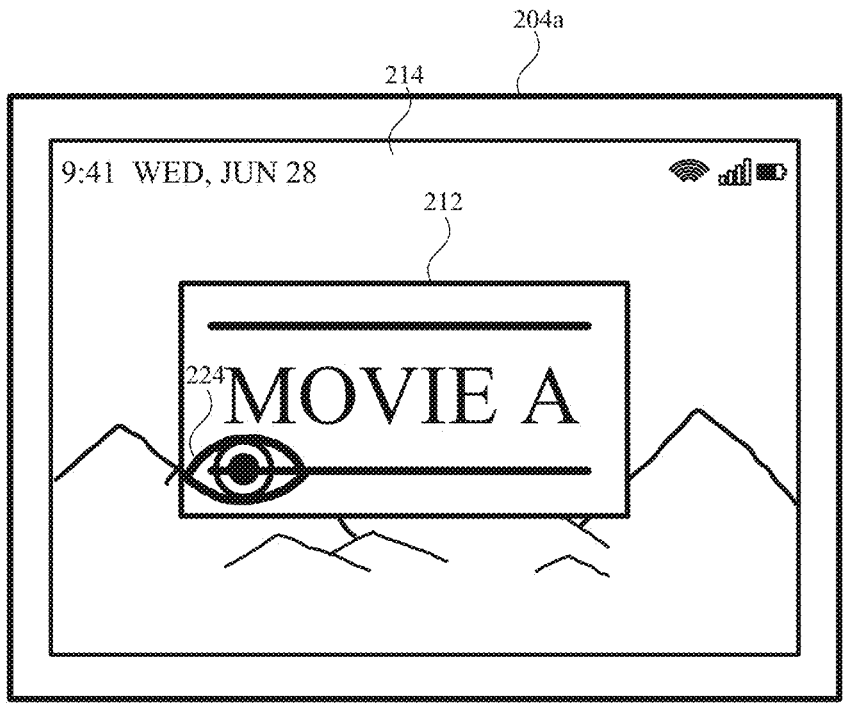

Turning to FIGS. 2J-2K, in some embodiments, display 204*a* displays different content in the background of content 212 based on a location of a user's attention (e.g., based on a location of a gaze of a user and/or where a user is looking). For example, in FIG. 2J, because a user's attention (e.g., gaze 224) is not directed to content 212 (e.g., gaze 224 is directed to a portion of display 204*a* that does not include content 212) (e.g., in response to the user's attention moving away from content 212), display 204*a* displays user interface 206 as a background. In FIG. 2K, because the user's attention (e.g., gaze 224) is directed to content 212 (e.g., gaze 224 is directed to a portion of display 204*a* that includes content 212) (e.g., in response to the user's attention moving to content 212), display 204*a* displays a live video feed (e.g., live video feed 214) of environment 200 exterior to platform 202 as a background. In some embodiments, the background behind content 212 switches between user interface 206 (or other user interfaces that do not include a live video feed of environment 200 exterior to platform 202) and a live video feed of environment 200 exterior to platform 202 as gaze 224 moves to and from content 212.

Figure 2L:
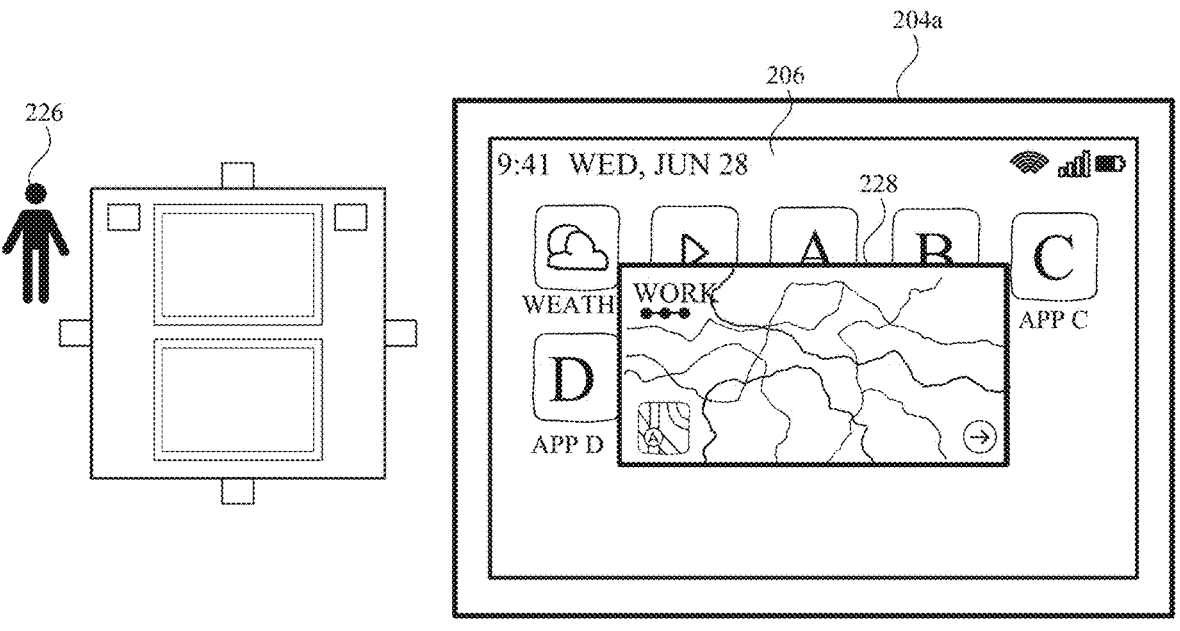
Figure 2M:
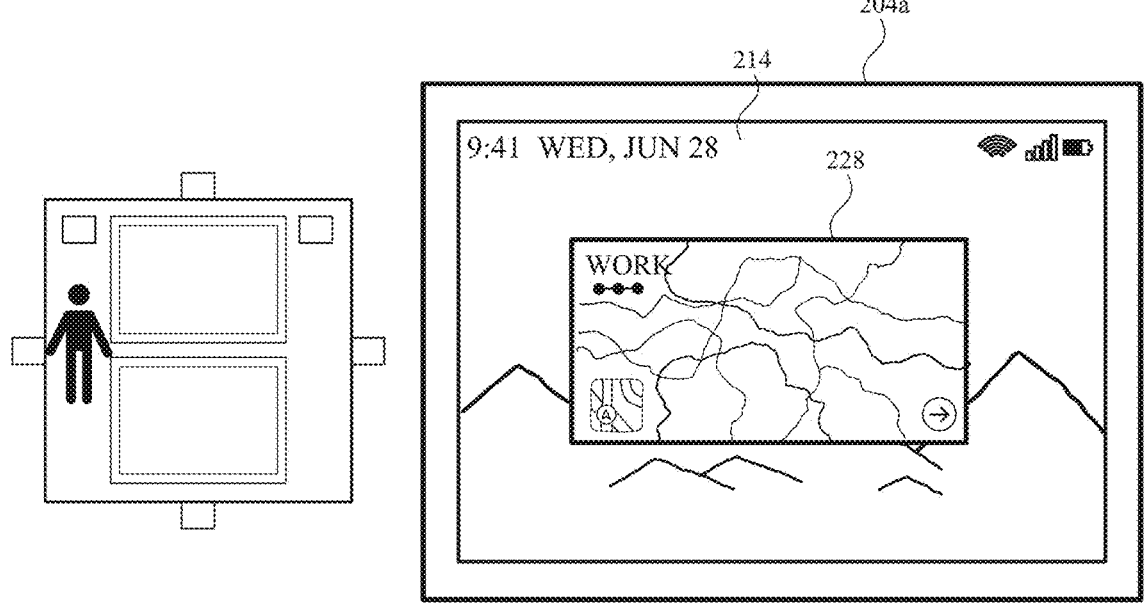

Turning to FIGS. 2L-2M, in some embodiments, display 204*a* displays different content in the background of content 212 based on a location of a user of platform 202. For example, in FIG. 2L, because user 226 is outside (e.g., not inside) platform 202 (e.g., in response to user 226 exiting platform 202), display 204*a* displays user interface 206 as a background. In FIG. 2M, because user 226 is inside platform 202 (e.g., in response to user 226 entering platform 202), display 204*a* displays a live video feed (e.g., live video feed 214) of environment 200 exterior to platform 202 as a background. In some embodiments, the background behind content 212 switches between user interface 206 (or other user interfaces that do not include a live video feed of environment 200 exterior to platform 202) and a live video feed of environment 200 exterior to platform 202 as user 226 enters and exits platform 202.

Additional descriptions regarding FIGS. 2A-2M are provided below in reference to method 300 described with respect to FIG. 3.

FIG. 3 is a flow diagram of an exemplary method 300 for displaying content with a live video feed, in accordance with some embodiments. In some embodiments method, 300 is performed at a computer system (e.g., computer system 152), a display (e.g., 121, 204*a*, and/or 204*b*), and/or a platform (e.g., a vehicle). In some embodiments, the computer system is within and/or a part of a platform (e.g., 202). In some embodiments, method 300 is governed by instructions that are stored in a non-transitory (or transitory) computer-readable storage medium and that are executed by one or more processors of a computer system (e.g., 152) and/or platform (e.g., a vehicle), such as the one or more processors 103 of system 100. Some operations in method 300 are, optionally, combined and/or the order of some operations is, optionally, changed.

In some embodiments, according to method 300, a computer system (e.g., 152 and/or a computer system in communication with platform 202) displays (302), via a display component (e.g., 121, 204*a*, and/or 204*b*) (e.g., a display, a display device, a monitor, a heads-up display, and/or a head-mounted display) located in an interior portion (e.g., 203) (e.g., a cabin) of a platform (e.g., a vehicle, car, truck, and/or a moveable platform), a user interface (e.g., 206). The computer system detects (304) (e.g., via one or more input devices, such as 156, 158, a mouse, a touch-sensitive surface, and/or a touch-sensitive display, and/or data input interfaces) a request (e.g., 250*a*) (e.g., an input and/or data) to display content (e.g., a movie, video, window, and/or application). In response to detecting the request to display the content, the computer system displays (306) (e.g., concurrently displays and/or initiates display of), via the display component, the content (e.g., 212 and/or 228) in a first region of the display component and a live video feed (e.g., 210, 214, and/or 216) in a second region (e.g., a region surrounding content 212) of the display component, wherein the live video feed includes video of an environment (e.g., 200) exterior to the platform captured by one or more cameras (e.g., 109, 156, and/or 206*a*-206*d*) of the platform. In some embodiments, the display component includes a display of a personal device (e.g., a smartphone, a smartwatch, a laptop computer, and/or a tablet computer) and/or a display of the platform (e.g., a display that is integrated into a seat, headrest, table, ceiling, wall, and/or other structure of the interior portion of the platform).

In some embodiments, the live video feed includes a first view (e.g., 214) (e.g., a first field of view, a forward-looking view, a first-person view, a view out of a first side and/or window of the platform, a view of a road, and/or a fisheye view) of the environment exterior to the platform. In some embodiments, the live video feed includes a wide-angle view (e.g., 210) (e.g., a wide-angle field of view, a stitched camera view, a field of view of two or more cameras, a 360-degree view, and/or a 360-degree field of view) of the environment exterior to the platform. In some embodiments, the wide-angle view includes a field of view that completely surrounds the platform. In some embodiments, the wide-angle view includes at least a portion of the field of view of a first camera and at least a portion of a field of view of a second camera different from the first camera (e.g., the portions of the fields of view of the first camera and the second camera are combined or stitched together to form the wide-angle view).

In some embodiments, while displaying the content and the live video feed, the computer system detects an input (e.g., 250c and/or 250d) (e.g., a tap input on a touch-sensitive surface, a press of a button, a voice input, and/or an air gesture); and in response to detecting the input, the computer system changes the live video feed from a first view (e.g., a field of view of a first camera and/or a field of view with a first angular extent) of the environment exterior to the platform captured by the one or more cameras to a second view (e.g., a field of view of a second camera and/or a field of view with a second angular extent that is different from the first angular extent) of the environment exterior to the platform captured by the one or more cameras (e.g., the computer system changes from 210 to 214 as shown in FIGS. 2D-2E or from 214 to 216 as shown in FIGS. 2E-2F). In some embodiments, while displaying the content and the live video feed, the computer system detects movement (e.g., 218 and/or as described with reference to FIG. 2H) (e.g., a change in direction, a change in velocity, acceleration, a change in acceleration, rotation, and/or vibration) of the platform; and in response to detecting the movement of the platform, the computer system changes the live video feed (e.g., the video of the environment exterior to the platform) based on the movement of the platform (e.g., from 214 in FIG. 2E to 214 in FIG. 2H). For example, in response to detecting a first movement of the platform, a first change is applied to the live video feed (e.g., the live video feed is changed in a first manner, in a first direction, and/or by a first amount); and in response to detecting a second movement of the platform different from the first movement of the platform, a second change, different from the first change, is applied to the live video feed (e.g., the live video feed is changed in a second manner, in a second direction, and/or by a second amount different from the first manner, the first direction, and/or the first amount).

In some embodiments, while displaying the content and the live video feed (e.g., 214 in FIG. 2E), the computer system detects an input (e.g., 250d) (e.g., a tap input on a touch-sensitive surface, a press of a button, a voice input, and/or an air gesture); and in response to detecting the input, the computer system adjusts (e.g., zooms in, zooms out, tilts, translates, and/or scrolls) the live video feed (e.g., the video of the environment exterior to the platform) based on the input (e.g., changes the live video feed from 214 to 216 as shown in FIGS. 2E-2F). In some embodiments, adjusting the live video feed includes: in accordance with a determination that the input corresponds to a first position (e.g., a first position on the display component), displaying (e.g., changing the live video feed to) a first adjusted view (e.g., 216) (e.g., a view in a first direction) of the environment exterior to the platform captured by the one or more cameras (e.g., in response to 250d, display 216); and in accordance with a determination that the input corresponds to a second position (e.g., a second position on the display component) different from the first position, displaying (e.g., changing the live video feed to) a second adjusted view (e.g., a view in a second direction different from the first direction) of the environment exterior to the platform captured by the one or more cameras different from the first adjusted view of the environment exterior to the platform captured by the one or more cameras (e.g., in response to an input on the left side of 204a, display a view of sunset 200c based on images captured by at least sensor 206b).

In some embodiments, the first region of the display component includes a graphical user interface window (e.g., an application window) (e.g., 212 is, or is displayed in, a user interface window). In some embodiments, the second region of the display component includes a background (e.g., relative to the first region) (e.g., a background of 212). In some embodiments, the second region is a widow (e.g., behind the first region). In some embodiments, the second region surrounds the first region (e.g., partially surrounds the first region, entirely surrounds the first region, and/or surrounds a threshold amount, such as 70 percent, 80 percent, or 90 percent of the first region) (e.g., 210, 214, and 216 surround content 212). In some embodiments, the second region includes an area around an edge (e.g., a portion of an edge and/or an entire edge or edges) of the display component (e.g., an area that touches and/or is adjacent to the edge of the display component) (e.g., 210, 214, and 216 are displayed along the edge of 204a).

In some embodiments, while displaying the content and the live video feed, the computer system detects movement (e.g., 218) (e.g., a change in direction, a change in velocity, acceleration, a change in acceleration, rotation, and/or vibration) of the platform; and in response to detecting the movement of the platform, the computer system changes (e.g., adjusts, moves, translates, scales, rotates, changes a position of, changes a size of, and/or changes an aspect ratio of) the first region of the display component in which content is displayed based on the movement of the platform (e.g., moves content 212 as shown in FIG. 2G) (e.g., the computer system displays the content in a third region of the display component that is different from the first region of the display component). For example, in response to detecting a first movement of the platform, a first change is applied to the first region (e.g., the first region is changed in a first manner, in a first direction, and/or by a first amount); and in response to detecting a second movement of the platform different from the first movement of the platform, a second change, different from the first change, is applied to the first region (e.g., the first region is changed in a second manner, in a second direction, and/or by a second amount different from the first manner, the first direction, and/or the first amount).

In some embodiments, while displaying the content and the live video feed, the computer system detects an input (e.g., 250b) (e.g., a tap input on a touch-sensitive surface, a press of a button, a voice input, an air gesture, a request to start the live video feed, and/or a request to stop the live video feed); and in response to detecting the input, the computer system changes (e.g., adjusts, moves, translates, scales, rotates, changes a position of, changes a size of, and/or changes an aspect ratio of) the first region in which the content is displayed (e.g., the computer system displays the content in a third region of the display component that is different from the first region of the display component) (e.g., translate and enlarge 212 as described with reference to FIG. 2D).

In some embodiments, displaying the content in the first region and the live video feed in the second region includes: in accordance with a determination that the display component is in a first position in the interior portion of the platform (e.g., the position of 204a in platform 202), displaying the content and the live video feed in a first configuration (e.g., the first region in which the content is displayed has a first position, orientation, shape, and/or size relative to the second region in which the live video feed is displayed) (e.g., display 214 in the background of 212); and in accordance with a determination that the display component is in a second position, different from the first position, in the interior portion of the platform (e.g., the position of 204b in platform 202), displaying the content and the live video feed in a second configuration different from the first configuration (e.g., the first region in which the content is displayed has a second position, orientation, shape, and/or size relative to the second region in which the live video feed is displayed) (e.g., display 216 in the background of 212).

In some embodiments, in accordance with (or, in some embodiments, in response to) a determination that a gaze of a user is directed to the content (e.g., 224 is directed to 212 in FIG. 2K) (e.g., the gaze of the user is directed to the first region of the display component and/or the user is looking at the content), the computer system displays (e.g., initiates, continues, and/or maintains display of) the live video feed (e.g., 214), including video of the environment exterior to the platform captured by the one or more cameras; and in accordance with (or, in some embodiments, in response to) a determination that the gaze of the user is not directed to the content (e.g., 224 is not directed to 212 in FIG. 2J) (e.g., the gaze of the user is not directed to the first region of the display component and/or the user is not looking at the content), the computer system ceases (or, in some embodiments, forgoes) display of the live video feed (e.g., displays 206 as shown in FIG. 2J) (e.g., the computer system displays the user interface without the live video feed) (e.g., the live video feed is replaced with a static image, a static background, a home screen, a user interface different from the live video feed, and/or a user interface that does not include video of the environment exterior to the platform captured by the one or more cameras).

In some embodiments, in accordance with (or, in some embodiments, in response to) a determination that a user is inside the interior portion of the platform (e.g., the user has entered the platform) (e.g., as shown in FIG. 2M), the computer system displays (e.g., continues and/or maintains display of) the live video feed (e.g., 210, 214, or 216), including video of the environment exterior to the platform captured by the one or more cameras; and in accordance with (or, in some embodiments, in response to) a determination that the user is not inside the interior portion of the platform (e.g., the user has exited and/or not entered the platform) (e.g., as shown in FIG. 2L), the computer system ceases (or, in some embodiments, forgoes) display of the live video feed (e.g., displays 206 as shown in FIG. 2L) (e.g., displaying the user interface without the live video feed) (e.g., the live video feed is replaced with a static image, a static background, a home screen, a user interface different from the live video feed, and/or a user interface that does not include video of the environment exterior to the platform captured by the one or more cameras).

This disclosure, for purpose of explanation, has been described with reference to specific embodiments. The discussions above are not intended to be exhaustive or to limit the disclosure and/or the claims to the specific embodiments. Modifications and/or variations are possible in view of the disclosure. Some embodiments were chosen and described in order to explain principles of techniques and their practical applications. Others skilled in the art are thereby enabled to utilize the techniques and various embodiments with modifications and/or variations as are suited to a particular use contemplated.

Although the disclosure and embodiments have been fully described with reference to the accompanying drawings, it is to be noted that various changes and/or modifications will become apparent to those skilled in the art. Such changes and/or modifications are to be understood as being included within the scope of this disclosure and embodiments as defined by the claims.

It is the intent of this disclosure that any personal information of users should be gathered, managed, and handled in a way to minimize risks of unintentional and/or unauthorized access and/or use.

Therefore, although this disclosure broadly covers use of personal information to implement one or more embodiments, this disclosure also contemplates that embodiments can be implemented without the need for accessing such personal information.

What is claimed is:

1. A system, comprising:
one or more processors; and
memory storing one or more programs configured to be executed by the one or more processors, the one or more programs including instructions for:
    displaying, via a display component, a user interface;
    detecting a request to display content;
    in response to detecting the request to display the content, displaying, via the display component:
        the content in a first region of the display component; and
        a live video feed in a second region of the display component; and
    while displaying the content in the first region of the display component and the live video feed in the second region of the display component:
        in accordance with a determination that a gaze of a user is directed to the content, maintaining display of the content and display of the live video feed; and
        in accordance with a determination that the gaze of the user is not directed to the content, ceasing display of the live video feed while maintaining display of the content.

2. The system of claim 1, wherein the live video feed includes a first view of an environment.

3. The system of claim 1, wherein the live video feed includes a wide-angle view of an environment.

4. The system of claim 1, wherein the one or more programs further include instructions for:
    while displaying the content and the live video feed, detecting an input; and
    in response to detecting the input, changing the live video feed from a first view of an environment captured by one or more cameras to a second view of the environment captured by the one or more cameras.

5. The system of claim 1, wherein the one or more programs further include instructions for:

while displaying the content and the live video feed, detecting movement; and in response to detecting the movement, changing the live video feed based on the movement.

6. The system of claim 1, wherein the one or more programs further include instructions for:

while displaying the content and the live video feed, detecting an input; and in response to detecting the input, adjusting the live video feed based on the input.

7. The system of claim 6, wherein adjusting the live video feed includes:

in accordance with a determination that the input corresponds to a first position, displaying a first adjusted view of an environment captured by one or more cameras; and in accordance with a determination that the input corresponds to a second position different from the first position, displaying a second adjusted view of the environment captured by the one or more cameras different from the first adjusted view of the environment captured by the one or more cameras.

8. The system of claim 1, wherein the first region of the display component includes a graphical user interface window.

9. The system of claim 1, wherein the second region of the display component includes a background.

10. The system of claim 9, wherein the second region surrounds the first region.

11. The system of claim 9, wherein the second region includes an area around an edge of the display component.

12. The system of claim 1, wherein the one or more programs further include instructions for:

while displaying the content and the live video feed, detecting movement; and in response to detecting the movement, changing the first region of the display component in which the content is displayed based on the movement.

13. The system of claim 1, wherein the one or more programs further include instructions for:

while displaying the content and the live video feed, detecting an input; and in response to detecting the input, changing the first region in which the content is displayed.

14. The system of claim 1, wherein displaying the content in the first region and the live video feed in the second region includes:

in accordance with a determination that the display component is in a first position, displaying the content and the live video feed in a first configuration; and in accordance with a determination that the display component is in a second position, different from the first position, displaying the content and the live video feed in a second configuration different from the first configuration.

15. A non-transitory computer-readable storage medium storing one or more programs configured to be executed by one or more processors of a computer system, the one or more programs including instructions for:

displaying, via a display component, a user interface;

detecting a request to display content;

in response to detecting the request to display the content, displaying, via the display component:

the content in a first region of the display component; and a live video feed in a second region of the display component; and while displaying the content in the first region of the display component and the live video feed in the second region of the display component:

in accordance with a determination that a gaze of a user is directed to the content, maintaining display of the content and display of the live video feed; and in accordance with a determination that the gaze of the user is not directed to the content, ceasing display of the live video feed while maintaining display of the content.

16. The non-transitory computer-readable storage medium of claim 15, wherein the live video feed includes a first view of an environment.

17. The non-transitory computer-readable storage medium of claim 15, wherein the live video feed includes a wide-angle view of an environment.

18. The non-transitory computer-readable storage medium of claim 15, wherein the one or more programs further include instructions for:

while displaying the content and the live video feed, detecting an input; and in response to detecting the input, changing the live video feed from a first view of an environment captured by one or more cameras to a second view of the environment captured by the one or more cameras.

19. The non-transitory computer-readable storage medium of claim 15, wherein the one or more programs further include instructions for:

while displaying the content and the live video feed, detecting movement; and in response to detecting the movement, changing the live video feed based on the movement.

20. The non-transitory computer-readable storage medium of claim 15, wherein the one or more programs further include instructions for:

while displaying the content and the live video feed, detecting an input; and in response to detecting the input, adjusting the live video feed based on the input.

21. The non-transitory computer-readable storage medium of claim 20, wherein adjusting the live video feed includes:

in accordance with a determination that the input corresponds to a first position, displaying a first adjusted view of an environment captured by one or more cameras; and in accordance with a determination that the input corresponds to a second position different from the first position, displaying a second adjusted view of the environment captured by the one or more cameras different from the first adjusted view of the environment captured by the one or more cameras.

22. The non-transitory computer-readable storage medium of claim 15, wherein the first region of the display component includes a graphical user interface window.

23. The non-transitory computer-readable storage medium of claim 15, wherein the second region of the display component includes a background.

24. The non-transitory computer-readable storage medium of claim 23, wherein the second region surrounds the first region.

25. The non-transitory computer-readable storage medium of claim 23, wherein the second region includes an area around an edge of the display component.

26. The non-transitory computer-readable storage medium of claim 15, wherein the one or more programs further include instructions for:

while displaying the content and the live video feed, detecting movement; and in response to detecting the movement, changing the first region of the display component in which the content is displayed based on the movement.

27. The non-transitory computer-readable storage medium of claim 15, wherein the one or more programs further include instructions for:

while displaying the content and the live video feed, detecting an input; and in response to detecting the input, changing the first region in which the content is displayed.

28. The non-transitory computer-readable storage medium of claim 15, wherein displaying the content in the first region and the live video feed in the second region includes:

in accordance with a determination that the display component is in a first position, displaying the content and the live video feed in a first configuration; and in accordance with a determination that the display component is in a second position, different from the first position, displaying the content and the live video feed in a second configuration different from the first configuration.

29. A method, comprising:

displaying, via a display component, a user interface;

detecting a request to display content;

in response to detecting the request to display the content, displaying, via the display component:

the content in a first region of the display component; and a live video feed in a second region of the display component; and while displaying the content in the first region of the display component and the live video feed in the second region of the display component:

in accordance with a determination that a gaze of a user is directed to the content, maintaining display of the content and display of the live video feed; and in accordance with a determination that the gaze of the user is not directed to the content, ceasing display of the live video feed while maintaining display of the content.

30. The method of claim 29, wherein the live video feed includes a first view of an environment.

31. The method of claim 29, wherein the live video feed includes a wide-angle view of an environment.

32. The method of claim 29, further comprising:

while displaying the content and the live video feed, detecting an input; and in response to detecting the input, changing the live video feed from a first view of an environment captured by one or more cameras to a second view of the environment captured by the one or more cameras.

33. The method of claim 29, further comprising:

while displaying the content and the live video feed, detecting movement; and in response to detecting the movement, changing the live video feed based on the movement.

34. The method of claim 29, further comprising:

while displaying the content and the live video feed, detecting an input; and in response to detecting the input, adjusting the live video feed based on the input.

35. The method of claim 34, wherein adjusting the live video feed includes:

in accordance with a determination that the input corresponds to a first position, displaying a first adjusted view of an environment captured by one or more cameras; and in accordance with a determination that the input corresponds to a second position different from the first position, displaying a second adjusted view of the environment captured by the one or more cameras different from the first adjusted view of the environment captured by the one or more cameras.

36. The method of claim 29, wherein the first region of the display component includes a graphical user interface window.

37. The method of claim 29, wherein the second region of the display component includes a background.

38. The method of claim 37, wherein the second region surrounds the first region.

39. The method of claim 37, wherein the second region includes an area around an edge of the display component.

40. The method of claim 29, further comprising:

while displaying the content and the live video feed, detecting movement; and in response to detecting the movement, changing the first region of the display component in which the content is displayed based on the movement.

41. The method of claim 29, further comprising:

while displaying the content and the live video feed, detecting an input; and in response to detecting the input, changing the first region in which the content is displayed.

42. The method of claim 29, wherein displaying the content in the first region and the live video feed in the second region includes:

in accordance with a determination that the display component is in a first position, displaying the content and the live video feed in a first configuration; and in accordance with a determination that the display component is in a second position, different from the first position, displaying the content and the live video feed in a second configuration different from the first configuration.

* * * * *